United States Patent
Hoshall (10) Patent No.: US 8,667,540 B2
(45) Date of Patent: Mar. 4, 2014

(54) WEB-BASED VIDEO BROADCASTING SYSTEM HAVING MULTIPLE CHANNELS

(75) Inventor: Thomas C. Hoshall, Oklahoma City, OK (US)

(73) Assignee: Apple Partners, LP, Oklahoma City, OK (US)

(*) Notice: Subject to any disclaimer, the term of this patent is extended or adjusted under 35 U.S.C. 154(b) by 239 days.

(21) Appl. No.: 11/825,486

(22) Filed: Jul. 6, 2007

(65) Prior Publication Data

US 2008/0178236 A1    Jul. 24, 2008

Related U.S. Application Data (60) Provisional application No. 60/819,533, filed on Jul. 7, 2006.

(51) Int. Cl.
H04N 5/445    (2011.01)
H04N 7/173    (2011.01)
G06F 3/00     (2006.01)

(52) U.S. Cl.
USPC ........ 725/53; 725/5; 725/37; 725/51; 725/57; 725/114; 725/115; 715/738

(58) Field of Classification Search
USPC .............. 725/5, 37, 51–53, 56, 57, 113–115; 715/738
See application file for complete search history.

(56) References Cited

U.S. PATENT DOCUMENTS

| | | |
|---|---|---|
| 5,539,871 A | 7/1996 | Gibson |
| 5,585,858 A | 12/1996 | Harper et al. |
| 5,590,262 A | 12/1996 | Isadore-Barreca |
| 5,613,057 A | 3/1997 | Caravel |
| 5,684,715 A | 11/1997 | Palmer |
| 5,708,845 A | 1/1998 | Wistendahl et al. |
| 5,931,908 A | 8/1999 | Gerba et al. |
| 6,025,837 A | 2/2000 | Matthews, III et al. |
| 6,055,560 A | 4/2000 | Mills et al. |
| 6,175,840 B1 | 1/2001 | Chen et al. |
| 6,229,524 B1 | 5/2001 | Chernock et al. |
| 6,229,541 B1 | 5/2001 | Kamen et al. |
| 6,295,055 B1 | 9/2001 | Miller et al. |

(Continued)

OTHER PUBLICATIONS

Youtube—Broadcast Yourself, Nov. 25, 2005, Youtube, pp. 1-7, http://web.archive.org/web/20051125044615/http://www.youtube.com/whats_new.php.*

(Continued)

Primary Examiner — Pinkal R Chokshi (74) Attorney, Agent, or Firm — Dunlap Codding, P.C.

(57) ABSTRACT

A web-based video broadcast system, comprising at least one web page in communication with a host system to permit a plurality of users and a plurality of content providers to access the host system. The host system is programmed to register a plurality of channels, each associated with a unique channel identifier, and to associate each of at least a portion of the plurality of channels with at least one content provider responsive to a request by the at least one content provider. The host system is further programmed to permit the at least one content provider associated with a channel to selectively upload to the host system at least one video file and associate the at least one video file with the channel. The host system is further programmed to store the at least one video file and continuously display the at least one video file responsive to a user selecting the channel via the at least one web page.

23 Claims, 5 Drawing Sheets (56) References Cited

U.S. PATENT DOCUMENTS

| | | | |
|---|---|---|---|
| 6,496,981 B1 | 12/2002 | Wistendahl et al. | |
| 6,569,206 B1 | 5/2003 | Dey et al. | |
| 6,570,586 B1 | 5/2003 | Kamen et al. | |
| 6,570,587 B1 | 5/2003 | Efrat et al. | |
| 6,631,523 B1 | 10/2003 | Matthews, III et al. | |
| 6,636,237 B1 | 10/2003 | Murray et al. | |
| 6,693,648 B1 | 2/2004 | Lyndon | |
| 6,714,215 B1 | 3/2004 | Flora et al. | |
| 6,774,926 B1* | 8/2004 | Ellis et al. | 348/14.01 |
| 6,791,579 B2 | 9/2004 | Markel | |
| 6,816,628 B1 | 11/2004 | Sarachik et al. | |
| 6,963,906 B2 | 11/2005 | Portuesi | |
| 6,976,028 B2* | 12/2005 | Fenton et al. | 715/700 |
| 7,042,471 B2 | 5/2006 | Glass et al. | |
| 7,103,905 B2* | 9/2006 | Novak | 725/46 |
| 7,167,855 B1* | 1/2007 | Koenig | 1/1 |
| 7,222,163 B1* | 5/2007 | Girouard et al. | 709/219 |
| 7,281,260 B2* | 10/2007 | Puente et al. | 725/110 |
| 7,653,614 B2* | 1/2010 | Smith | 707/769 |
| 7,760,956 B2* | 7/2010 | Lin et al. | 382/254 |
| 7,769,827 B2* | 8/2010 | Girouard et al. | 709/219 |
| 7,814,513 B2* | 10/2010 | Sarukkai et al. | 725/46 |
| 2002/0007493 A1 | 1/2002 | Butler et al. | |
| 2002/0010932 A1* | 1/2002 | Nguyen et al. | 725/51 |
| 2002/0013947 A1* | 1/2002 | Russell et al. | 725/90 |
| 2002/0056136 A1 | 5/2002 | Wistendahl et al. | |
| 2002/0138844 A1* | 9/2002 | Otenasek et al. | 725/87 |
| 2002/0184630 A1* | 12/2002 | Nishizawa et al. | 725/44 |
| 2003/0052905 A1 | 3/2003 | Gordon et al. | |
| 2004/0031058 A1* | 2/2004 | Reisman | 725/112 |
| 2004/0098302 A1* | 5/2004 | Feeley | 705/14 |
| 2004/0103433 A1* | 5/2004 | Regeard et al. | 725/53 |
| 2004/0139465 A1 | 7/2004 | Matthews, III et al. | |
| 2004/0225728 A1* | 11/2004 | Huggins et al. | 709/223 |
| 2005/0210145 A1* | 9/2005 | Kim et al. | 709/231 |
| 2005/0281535 A1* | 12/2005 | Fu et al. | 386/69 |
| 2006/0010468 A1* | 1/2006 | Loughridge | 725/38 |
| 2006/0123455 A1* | 6/2006 | Pai et al. | 725/133 |
| 2007/0106551 A1* | 5/2007 | McGucken | 705/10 |
| 2007/0124779 A1* | 5/2007 | Casey et al. | 725/87 |
| 2007/0124781 A1* | 5/2007 | Casey et al. | 725/94 |
| 2007/0130595 A1* | 6/2007 | McElhatten et al. | 725/88 |
| 2007/0157228 A1* | 7/2007 | Bayer et al. | 725/34 |
| 2007/0177606 A1* | 8/2007 | Jabri et al. | 370/395.5 |
| 2007/0239838 A1* | 10/2007 | Laurel et al. | 709/206 |
| 2007/0294177 A1* | 12/2007 | Volk et al. | 705/52 |
| 2008/0052630 A1* | 2/2008 | Rosenbaum et al. | 715/738 |
| 2008/0052742 A1* | 2/2008 | Kopf et al. | 725/34 |
| 2008/0184117 A1* | 7/2008 | Alsbury et al. | 715/719 |
| 2008/0189752 A1* | 8/2008 | Moradi et al. | 725/105 |
| 2008/0201740 A1* | 8/2008 | Boyer et al. | 725/39 |
| 2008/0307475 A1* | 12/2008 | Liwerant et al. | 725/109 |
| 2009/0070832 A1* | 3/2009 | Urban | 725/86 |
| 2009/0150922 A1* | 6/2009 | Russ et al. | 725/30 |
| 2009/0320073 A1* | 12/2009 | Reisman | 725/51 |
| 2010/0011398 A1* | 1/2010 | Van Steenbergen | 725/109 |
| 2011/0099584 A1* | 4/2011 | Rodriguez | 725/51 |
| 2011/0231877 A1* | 9/2011 | Redling et al. | 725/42 |
| 2011/0271314 A1* | 11/2011 | Hoshall | 725/109 |

OTHER PUBLICATIONS

Youtube Blog, Jun. 2, 2006, Youtube, p. 1 http://web.archive.org/web/20060605155407/http://www3.youtube.com/blog.*
Beeline TV—Watch TV Online—Free Internet TV Channels, http://web.archive.org/web/20070703023305/http://beelinetv.com/, internet archived on Jul. 3, 2007; pp. 1-7.
About blip.tv; About Blip; http://web.archive.org/web/20070624045454/blip.tv/about/, Internet archived on Jun. 24, 2007, pp. 1-3.
Blip.tv (beta), http://web.archive.org/web/20070624032142/http://blip.tv/ ,archived on Jun. 24, 2007; Full article, It's Not All YouTube—The Web Is a Trove of Watchable Videos, by Walter S. Mossberg, Mar. 1, 2007, 6 pages.
Brightcove (beta)—FAQ; Help, http://web.archive.org/web/20070701083327/http://www.brightcove.com/help/; archived on Jul. 1, 2007, pp. 1-9.
Broadcaster.com—Home—Viral Video Clips, Live Community, News, Software, Movies, . . . , http://web.archive.org/web/20070625075751/www.broadcaster.com/aboutus; archived on Jun. 25, 2007, pp. 1 of 1.
Welcome to Broadcaster.com—Home—Viral Clips, Live Community, News, Software, Movies, . . . ; http://web.archive.org/web/20070624002309/http://www.broadcaster.com/; archived on Jun. 24, 2007, pp. 1-2.
Channelchooser is a free TV-portal. Watch here only the best online news, entertainment, sports and music TV-channels and videos. Pick, push and play on Channelchooser; http://web.archive.org/web/20070704165306/http://channelchooser.com/; archived on Jul. 4, 2007, pp. 1-5.
Free Internet TV—Channel King, "Welcome to Channel King! We offer over 230 free Internet TV channels, get started by selecting one below", http://web.archive.org/web/20070701204521/http://www.channelking.com/, archived on Jul. 1, 2007, pp. 1 -2.
Current TV, "The TV Network Created by the People Who Watch It," http://web.archive.org/web/20070630230739/http://www.current.tv/, archived on Jun. 30, 2007, pp. 1-2.
Dailymotion—Share Your Videos, "FAQ Frequently Asked Questions, Dailymotion", http://web.archive.org/web/20070605124702/www.dailymotion.com/faq; archived on Jun. 5, 2007, pp. 1-8.
Dailymotion—Share Your Videos advertising, http://web.archive.org/web/20070630202948/www.dailymotion.com/us; archived on Jun. 30, 2007, p. 1 of 1.
Free internet TV, fantasy tv.com, watch TV live internet, free live Internet TV broadcast, Fr . . . ; http://web.archive.org/web/20070627023424/http://www.fantasv-tv.com/index.html; archived on Jun. 27, 2007, p. 1 of 1.
"Find Internet TV, Search, Find. Watch—About Us"; http://web.archive.org/web/20070702172146/www.findinternettv.com/About.aspx; archived on Jul. 2, 2007, pp. 1-3.
Find Internet TV—Search. Find. Watch TV on the Internet, New Features; http://web.archive.org/web/20070702232413/http://www.findinternettv.com/; archived on Jul. 2, 2007, pp. 1-6.
Free TV on PC Software.com, "Free TV on PC Software Version 5.0," http://www.freetvonpcsoftware.com; "Are You Tired of Watching the Same Boring TV Programs?—Frequently Asked Questions" http://web.archive.org/web/20070602143613/www.freetvonpcsoftware.com/faqs.asp; archived on Jun. 21, 2007, Copyright 2007 All My Ideas, LLC; p. 1-2.
Watch Free TV on Your PC, "Free TV on PC Software version 5.0, Our has Tons of Great Benefits!", http://www.freetvonpcsoftware.com ; Copyright 2007 All My Ideas LLC; http://web.archive.org/web/20070705053131/http://www.free-sky-tv.usi; Archived on Jul. 5, 2007, pp. 1-2.
Watch online news, entertainment, music and sports TV-channels for free, Channelchooser is a free TV-portal; http://web.archive.org/web/20070704165306/hftp://channelchoosercom/; archived on Jul. 4, 2007, pp. 1-5.
Friction.tv, "About Friction.tv," We are good listeners; *Friction.tv—spark the debate*, http://web.archive.org/web/20070606212418/www.friction.tv/about_us.php; archived on Jun. 6, 2007, pp. 1-2.
Friction.tv, "Welcom Friction.tv offers you the platform to stand up and make yourself heard! Start new debates or fire back your opinion at others. It's time to make up your mind, upload your video and spark the debate," Friction.tv—spark the debate; http://web.archive.org/web/20070704212355/http://www.friction.tv/; archived on Jul. 4, 2007, pp. 1-3.
green.tv >> Video, "*Highlights*", what do you think of the films on green.tv? talk on our blog?; http://web.archive.org/web/20070625035530/http://www.green.tv/; archived on Jun. 25, 2007, pp. 1-4.
Free Internet TV—Watch Live TV broadcasts on the Internet!, Hollersoft, Download Free Internet TV; http://web.archive.org/web/20070623151135/www.holersoft.net/tv.htm; archived on Jun. 23, 2007, Copyright 2001-2007 www.holersoft.net pp. 1-2.
Holersoft—Free Internet TV, an Internet television tuner program; Free Internet TV; Copyright 2001-2007 www.holersoft.net; http://

(56) References Cited

OTHER PUBLICATIONS web.archive.org/web/20070627005401/http://www.holersoft.net/; archived on Jun. 27, 2007; pp. 1 of 1.
Watch Free TV Channels at Imvite.com, About Us; http://web.archive.org/web/20070426044021/www.imvite.com/about.php; archived on Apr. 26, 2007, p. 1 of 1.
Imvite.com, "Live Online TV, Funny Videos, and Games at Imvite", "Imvite is Your Source for Online TV and Videos!", Copyright 2007 Imvite, Inc., http://web.archive.org/web/20070523091153/http://www.imvite.com/; archived on May 23, 2007, pp. 1 of 1.
Inet-TV.us, Inet-TV Version 2.1, Satellite TV on your PC; http://web.archive.org/web/20070626051750/http://inet-tv.us/; archived on Jun. 26, 2007, pp. 1-3.
"i"tv, "InternetTVaccess", internetTVaccess.com, frequently asked questions, http://web.archive.org/web/20070624064307/www.internettvaccess.com/faq.asp; archived on Jun. 24, 2007, p. 1 of 1.
The gofish team, Video, Free video clips and films at GoFish. Watch free funny video clips and more!; Made-for-Internet Shows; 2005-2007 GoFish Corporation; http://web.archive.org/web/20070702224954/http://www.gofish.com/; archived on Jul. 2, 2007, pp. 1-5.
Internet TV access, Satellite TV; Introduction page; No subscription needed & no recurring Charges . . . Ever!!; http://web.archive.org/web/20070620151938/http:/www.internettvaccess.com/; archived on Jun. 20, 2007; p. 1 of 1.
joiningthedots.tv, Independent film for independent people, "About", Register Now, http://web.archive.org/web/20070219121015/www.joiningthedots.tv/abouthtml; archived on Feb. 19, 2007, p. 1 of 1.
joiningthedots.tv, independent film for independent people, Home, Register Now, http://web.archive.org/web/20070219110141/http://www.joiningthedots.tv/; archived on Feb. 19, 2007, p. 1 of 1.
Joost—About us, TV anywhere, anytime . . . ; Joost—next-generation TV; http://web.archive.org/web/20070623052803/www.joost.com/about.html; archived on Jun. 23, 2007, pp. 1-3.
Joost—The new way of watching free, full-screen, high-quality TV on the internet; "The new way of watching TV", Countdown to Joost™; http://web.archive.org/web/20070701073435/http://www.joost.com/; archived on Jul. 1, 2007, pp. 1-2.
Our Story—Online Television—English, About JumpTV, "Our Story", archived on Jun. 23, 2007, http://web.archive.org/web/20070623033259/www.jumptv.com/en/about; pp. 1-2.
Free Online TV: Watch Free Global TV and Online Video from JumpTV—Online Televi . . . ; Now Watch TV for Free on JumpTV; http://web.archive.org/web/20070705183755/http://www.jumptv.com/; archived on Jul. 5, 2007, pp. 1-7.
KTVB.Com—7 On Demand Video, Idaho News Now, Member Center, http://web.archive.org/web/20061031125005/www.ktvb.com/video/; Copyright 2006 KTVB-TV; archived on Oct. 31, 2006, pp. 1-9.
Link TV—Television Without Borders, Global and national news, uncompromising documentaries and diverse cultural programs, connecting you to the . . . ; http://web.archive.org/web/20070703070954/http://www.linktv.org/; archived on Jul. 3, 2007, pp. 1-3.
liveplayer.tv: Live Internet TV stations. More than 3000 channels, Sports, TV shows, Mo . . . ; "Frequently Asked Questions", Copyright 2007, liveplayer.tv; http://web.archive.org/web/20070624163611/liveplayer.tv/faq.asp ; archived on Jun. 24, 2007, pp. 1-3.
liveplayer.tv: Live Internet TV stations. More than 3000 channels, Sports, TV shows, Mo . . . ; liveplayer.tv provides a wide selection of the best broadband Internet television channels; http://web.archive.org/web/20070628232500/http://liveplayer.tv/; Copyright 2007, liveplayer.tv; archived on Jun. 28, 2007, pp. 1-4.
MainaTV!, "About ManiaTV!", The ManiaTV! Network http://web.archive.org/web/20070524024159/www.maniatv.com/About/Us; archived on May 24, 2007, pp. 1-2.
Watch Live and on Demand Internet Television or Create Your Own TV Channel—ManiaTV, Home page; http://web.archive.org/web/20070526093153/http://www.maniatv.com/; archived on May 26, 2007, pp. 1-4.

About MediaZone, "Media Zone is a leading global online broadcaster specializing in sports, entertainment, and international programming. We offer subscription and pay-per-view access to live and on Demand programs to a substantial and fast-growing paid customer base", Looking for a truly viable online broadcast solution? http://web.archive.org/web/20070621013955/http://corp.mediazone.com/corp/, archived on Jun. 21, 2007, p. 1 of 1.
Pyro.TV Support—Frequently Asked Questions, You Are What You Watch: Online Video and TV Channels—Pyro.TV Support Page;Copyright © 2007 Vibe Solutions Group; http://web.archive.org/web/20070702030029/www.pyro.tv/support/ ; archived on Jul. 20, 2007, pp. 1-2.
Revision3—About Us, Get Rev3 gear!, Copyright 2006-2007, Revision3 Corporation; http://web.archive.org/web/20070614092153/revision3.com/about; archived on Jun. 14, 2007, pp. 1-3.
Revision3, Get Rev3 gear! Copyright 2006-2007 Revision3 Corporation; Episodes, http://web.archive.org/web/20070629142541/http://revision3.com/; archived on Jun. 29, 2007, pp. 1-4.
Rocketboom RSS, The Jet Set Show—"For the kid in all of us", Rocketboom, P.O. Box 804, Planetarium Station, New York, NY 10024-0545; http://web.archive.org/web/20070310144330/www.rocketboom.com/vlog/about.html, archived on Mar. 10, 2007, pp. 1-3.
RocketBoom2.0, daily with joanne, Wednesday Mar. 7, 2007: daily; http://web.archive.org/web/20070308070833/www/rocketboom.com/vlog/; archived on Mar. 8, 2007, pp. 1 of 1.
SatellitePro.TV, Over 2000 TV Stations on your PC or Laptop for free!!, Instantly Turn your Computer into a Super TV; Copyright 1998-2007 Satellitepro.tv; http://web.archive.org/web/20070219225000/http://www.satellitepro.tv/; archived on Feb. 19, 2007, pp. 1-7.
Watch all your favorite television shows, cartoons, movies, and anime online! For free @ ShowStash.com; Television, Cartoons, Anime and Movies; http://web.archive.org/web/20070706180305/http://www.showstash.com/; archived on Jul. 6, 2007; pp. 1-4.
About Us—Free P2P internet TV/live football, NBA, cricket; About Us; http://web.archive.org/web/20070626193344/www.sopcast.org/info/aboutus.jsp; archived on Jun. 26, 2007, pp. 1 of 1.
SopCast—Free P2P Internet TV/live, football, NBA, cricket; Latest Version: SopCast 1.1.2; Easy way to embed SopCast; Copyright © 2006 SopCast.com; http://web.archive.org/web/20070707032113009/http://www.sopcast.org/; archived on Jul. 3, 2007, pp. 1-2.
Free P2P internet TV/live football, NBA, cricket; User Manual", http://web.archive.org/web/20070624171517rn_1/www.sopcast.org/doc/; archived on Jun. 24, 2007, pp. 1-7.
http://www.squidtv.net/; Squid TV;Internet Television Guide; Hotel Guide; http://web.archive.org/web/20070606193944/http://squidtv.net/; Copyright © 2001-2007 archived on Jun. 6, 2007, pp. 1 of 1
Stage6—Upload Video Clips, Share, Watch, Download Videos; Hello and welcome to Stage6, http://web.archive.org/web/20070617064358/stage6.divx.com/info/about; archived on Jun. 17, 2007; pp. 1 of 1.
Stage6—Upload Video Clips, Share, Watch, Download Videos; "Featured videos", Featured channels and Who waited in line for an iPhone? http://web.archive.org/web/20070617064358/stage6.divx.com/info/about; archived on Jun. 17, 2007, pp. 1-2.
Satellite TV for PC, "FAQ", http://web.archive.org/web/20070614032107/www.tv-4-pc.com/faq.asp; © 2007, www.tv-4-pc.com; Archived on Jun. 14,2007, pp. 1-2.
Satellite TV for PC, "100% Legal. No hacking or cracking. No extra hardware needed. Use our software to get instant access to more than 2500 Satellite TV channels from all over the world. Now with On Demand TV", http://web.archive.org/web/20070605034234/http://www.tv-4pc.com/; archived on Jun. 5, 2007; pp. 1 of 1.
TVU networks/Welcome, "The best way to watch: Get the Free TVUPlayer," © Copyright 2007, TVU networks; http://web.archive.org/web/20070703001222/http://www.tvunetworks.comi; archived on Jul. 3, 2007, pp. 1 of 1.
TVU networks/What is TVU networks? "What is TVU networks?", http://web.archive.org/web/20070630112934/pages.tvunetworks.com/doc/whatis.html; © Copyright 2007, TVU networks; archived on Jun. 30, 2007, pp. 1 of 1.

(56) References Cited

OTHER PUBLICATIONS

Upstream.tv, "Live Interactive Video for Everyone. Create your own broadcast! It takes just minutes . . . ", http://web.archive.org/web/20070702150546/ustream.tv/get-started; archived on Jul. 21, 2007, pp. 1-3.

Ustream.tv, "Live Interactive Video for Everyone", Sign Up!, http://web.archive.org/web/20070705093402/http://ustream.tv/; archived on Jul. 5, 2007, pp. 1-8.

uVu—An online video portal for the South Florida community powered by WPBT Chann . . . ; "Browse by Category", http://web.archive.org/web/20070426035052/uvu.channel2.org/PublicSite/About.aspx; archived on Apr. 26, 2007; pp. 1 of 1.

uVu—An online video portal for the South Florida community powered by WPBT Chann . . . ; "Header—Meet, Watch, Share", http://web.archive.org/web/20070506074212M_1/uvu.channel2.org/PublicSite/Default.aspx; archived on May 6, 2007, pp. 1 of 1.

Veg TV About Us, "vegtv.com, About Us" Your Host Marie Oser; Veg TV Inc., 2005; http://web.archive.org/web/20070608045637/www.vegtv.com/AboutUs/index.htm; archived on Jun. 8, 2007, pp. 1-2.

Welcome to VEG TV!, "Join the Online Video Revolution! Free Video! No tools, no software, no cost, no kidding! We do it all!", Forum & Taste of Health, http://web.archive.org/web/20070609112335/http://www.vegtv.com/; archived on Jun. 9, 2007, pp. 1-3.

FAQ/Veoh Video Network, "Frequently Asked Questions", http://web.archive.org/web/20070621044059/appserver.veoh.com/static/corporate/faq.html; archived on Jun. 21, 2007, pp. 1-9.

Online videos: From home videos to premium internet television content/Veoh Video Ne . . . ; "Be the first to get veohTV, Sign Up Now!", http://web.archive.org/web/20070626190750/http://www.veoh.com/ ; Jun. 26, 2008, pp. 1-6.

"Welcome to Google Video, About Google Video", http://web.archive.org/web/20070617231556/http://video.google.com/video_about.html; archived on Jun. 17, 2007, pp. 1 of 1.

Google Video, "Google Video Beta", Top 100 ComedyMusic videosSportsAnimationTV shows; http://web.archive.org/web/20070705131512/http://video.google.com/; archived on Jul. 5, 2007, pp. 1-3.

Vidiac—Create your own Internet TV Channel, "About Us, Our Mission", © 2004-2006 Vidiac, Inc., 2020 Howell Mill Rd., NW Suite C 212, Atlanta, GA 30318-1732; http://web.archive.org/web/20070701065115/www.vidiac.com/about.aspx; archived on Jul. 1, 2007, pp. 1-2.

Vidiac.com, "Start your Own Video Website!", http://web.archive.org/web/20070701064926/http://www.vidiac.com/; archived on Jul. 1, 2007, pp. 1-3.

Vimeo. Because everyone shouldn't watch everything. "You're new, aren't you?" and "Inbox" http://web.archive.org/web/20070702150421/http://www.vimeo.com/ ; archived on Jul. 2, 2007, pp. 1-5.

Vodpod: faq, "Home Explore Watch", http://web.archive.org/web/20070608131037/www.vodpod.com/site/faq; archived on Jun. 8, 2007, pp. 1-5.

Vuze by Azureus—High Definition Movies and Videos, "Vuze—The largest library of Hi-def videos. Fast, open and on-demand", http://web.archive.org/web/20070609124207rn_1/www.vuze.com/app; archived on Jun. 9, 2007, pp. 1 of 1.

Coming Soon, "Wi-FiTV™, Select From 450 Live WI-FI TV Stations", frequently asked questions (FAQ); ©2006 Wi-Fi TV; http://web.archive.orq/web/20070526103125/wi-fitv.com/FAQ.aspx; archived on May 26, 2007, pp. 1-2.

Wi-FiTV™, "Home" , Station of the Week, my Wi-FiTVparty.com, your private party room, http://web.archive.org/web/20070603202546/http://wi-fitv.com/ ; archived on Jun. 3, 2007, pp. 1-2.

Info wwiTV.com, info@wwitv.com; Fran Huisman, CEO wwiTV.com B.V. The Netherlands, http://web.archive.org/web/20070709143804/wwitv.com/page/wwitv.htm; archived on Jul. 9, 2007, pp. 1 of 1.

wwwiTV.com—The ultimate guide to Live TV webcasts, 2674 online TV stations listed, Copyright © 198-2007 World Wide Internet TeleVision, http://web.archive.org/web/20070705100156/http:/wwitv.com/portal.htm; archived on Jul. 5, 2007, pp. 1-2.

YouAreTV—The best independent films, shows, and videos online., "Finally. A site that makes sense of your video online"; http://web.archive.org/web/200705222034/www.youare.tv/about/php ; archived on May 22, 2007, pp. 1 of 1.

YouAreTV—The best independent films, shows, and videos online., youareTV)), "Watch great indie videos", Freshest videos on YouAreTV/>>More New Videos, & Hottest videos in YouAreTV http://web.archive.org/web/20070611163657/http://www.youare.tv/; archived on Jun. 11, 2007, pp. 1-4.

YouTube—Broadcast Yourself. "About YouTube", © 2007 YouTube, LLC., http://web.archive.org/web/20070617231359/www.youtube.com/t/about; archived on Jun. 17, 2007, pp. 1-2.

YouTube—Broadcast Yourself, "Feature Videos", http://web.archive.org/web/20070621031645/http://www.youtube.com/; archived on Jun. 21, 2007, pp. 1-2.

Zattoo—TV to Go, "Member Login", choose your language; Please log in or sign up to download the Zatto player; "Zatto—TV to Go" http://web.archive.org/web/20070626205729/http://zattoo.com/ ; archived on Jun. 26, 2007, pp. 1-4.

Weischedel, Situational and Competitive Analysis OnNowTV.com, prepared May 2007, not published.

Internet TV—MediaZone, Frequently-Asked-Questions (FAQ), http://web.archive.org/web/20070616113934/www.mediazone.com/mediazone/faq.jsp, archived on Jun. 16, 2007; pp. 1-3.

Internet TV and Video, mediazone, "Watch the 2007 Indianpolis 500", MediaZone is TV on the Web; Copyright 2007 MediaZone, http://web.archive.org/web/20070614163532/www.mediazone.com/channel/new_homepag . . . , archived on Jun. 14, 2007, pp. 1 of 1.

Web 2.0 video clips sharing community—Metacafe, Site Video Search and Family Filter Settings, About Us, http://web.archive.org/web/20070630012809/http://www.metacafe.com/aboutUs/, archived on Jun. 30, 2007, pp. 1-2.

Metacafe—Best Videos & Funny Movies, Site Video Search and Family Filter Settings, Copyright © 2003-2007 Metacafe, Inc., http://web.archive.org/web/20070705164340/http://www.metacafe.com/, archived on Jul. 5, 2007, pp. 1-8.

Help Center at MusicPlusTV.com/help/index.php, Watch M+Live, "MusicPlusTV.com", help center>Frequently Asked Questions, http://web.archive.org/web/20070510035652/musicplustv.com/help/index.php, archived on May 10, 2007, Copyright © 2004-2007 Music Plus Television Network, Inc., pp. 1-5.

MusicPlusTV.com: version 3.0; http://web.archive.org/web/20070705051819/http://musicplustv.com/; archived on Jul. 5, 2007, pp. 1-2.

MyEasyTV.com—Watch TV Online for free—Sports, Movies, News, Music, Cartoons an . . . , Welcome to MyEasyTV.com http://web.archive.org/web/20070702011354/http://www.myeasyty.com/index.html, archived on Jul. 2, 2007, Copyright 2007 © MyEasyTV.com; pp. 1-2.

Narrowstep—the TV on the Internet Company Provides Internet TV Sofware Platforms, Services, and Solutions; About Us, © 2007 Narrowstep™;; http://web.archive.org/web/20071021003105/www.narrowstep.com/about/06252007—Frontier-Launch; archived on Oct. 21, 2007, pp. 1-3.

Network2 TV Online Guide/About, Narrowstep—Internet TV Company, Internet platform, Internet TV products, Internet . . . ; Narrowstep—The TV on the Internet Company Provides Internet TV Software Platforms, Services, and Solutions;, archived on Jun. 26, 2007, http://web.archive.org/web/20070626105223/http://www.narrowstep.com/; pp. 1 of 1.

Network2 TV Online Guide/About; Network2, "your guide to tv on the internet Suman", http://web.archive.org/web/20070516021114rn_1/network2.tv/about/; archived on May 16, 2007, pp. 1-3.

(56) References Cited

OTHER PUBLICATIONS

Network2 TV Online Guide/Home; Network2, "your guide to TV on the internet Suman", http://web.archive.org/web/20070629172801rn_1/network2.tv/i Archived on Jun. 29, 2007, pp. 1-4.

Revver, "What is Revver?", http://web.archive.org/web/20070617022508/http;llone.revver.com/go/about; archived on Jun. 17, 2007, Copyright 2007 Revver, Inc., pp. 1-4.

Revver, "Satacracy 88 ep9 part 3", http://web.archive.orq/web/20070705162530/http://one.revvercom; archived on Jul. 5, 2007.

Outloud.TV—About, Copyright © 2003-2007 Outloud.TV Foundation; http://web.archive.org/web/20070705071514/www.outloud.tv/about/ ; archived on Jul. 5, 2007, pp. 1 of 1.

Outloud.TV—Broadcast your video's everywhere! Copyright © 2003-2007 Outloud.TV Foundation; http://web.archive.org/web/20070705071304/http://www.outloud.tv/; archived on Jul. 5, 2007; pp. 1-5.

You Are What You Watch: Online Video and TV Channels—Pyro.TV Publishers Page, "3 Great Reasons to Become a Pyro.TV Publisher", http://web.archive.org/web/20070702030059/www.pyro.tv/publishers/; archived on Jul. 20, 2007, pp. 1 of 1.

* cited by examiner

WEB-BASED VIDEO BROADCASTING SYSTEM HAVING MULTIPLE CHANNELS

CROSS-REFERENCE TO RELATED APPLICATIONS

This application claims the benefit of U.S. Provisional Application No. 60/819,533 filed Jul. 7, 2006, which is incorporated herein by reference in its entirety.

DETAILED DESCRIPTION OF THE INVENTION

Figure 1:
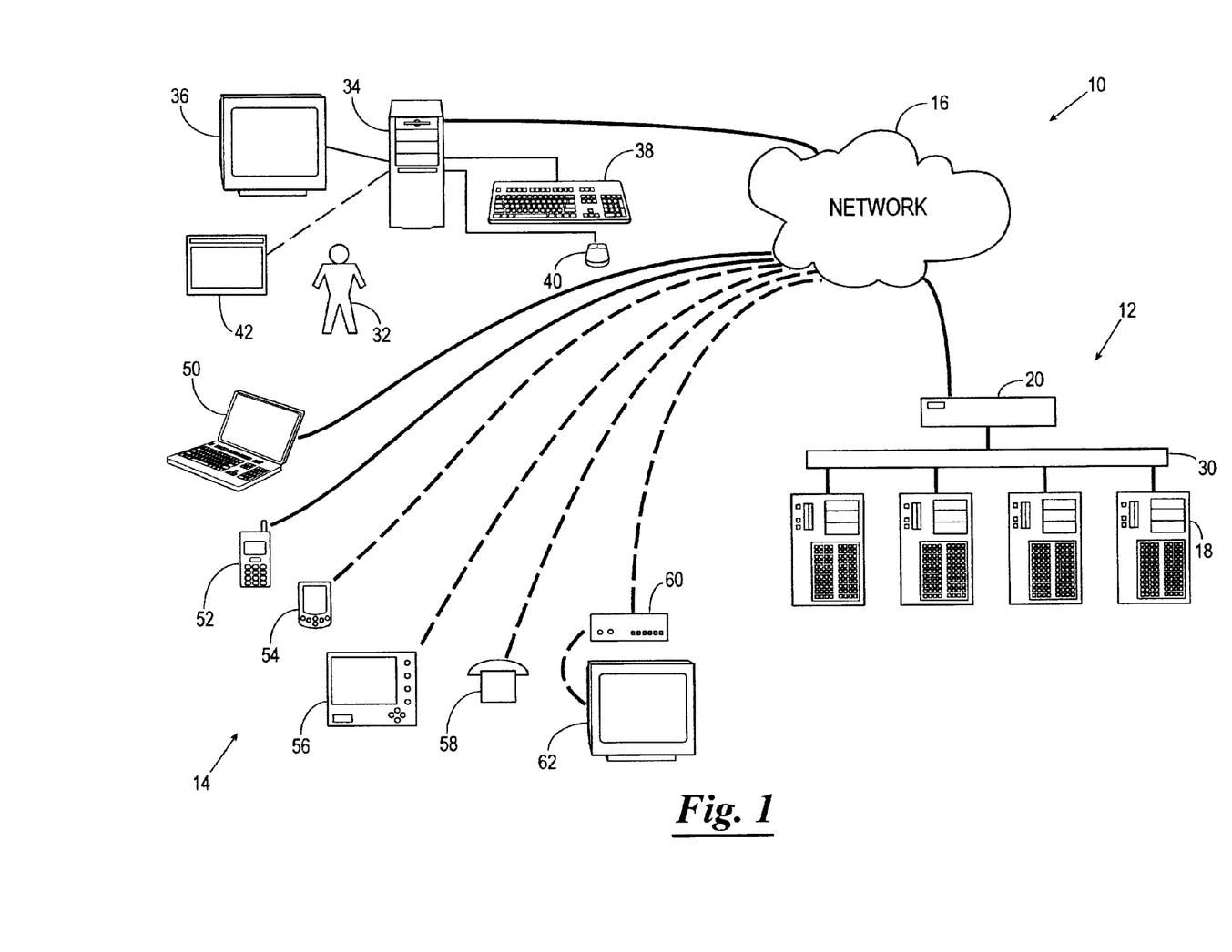
FIG. 1 is a schematic view of a video broadcasting system constructed in accordance with one embodiment of the present invention.
Figure 2:
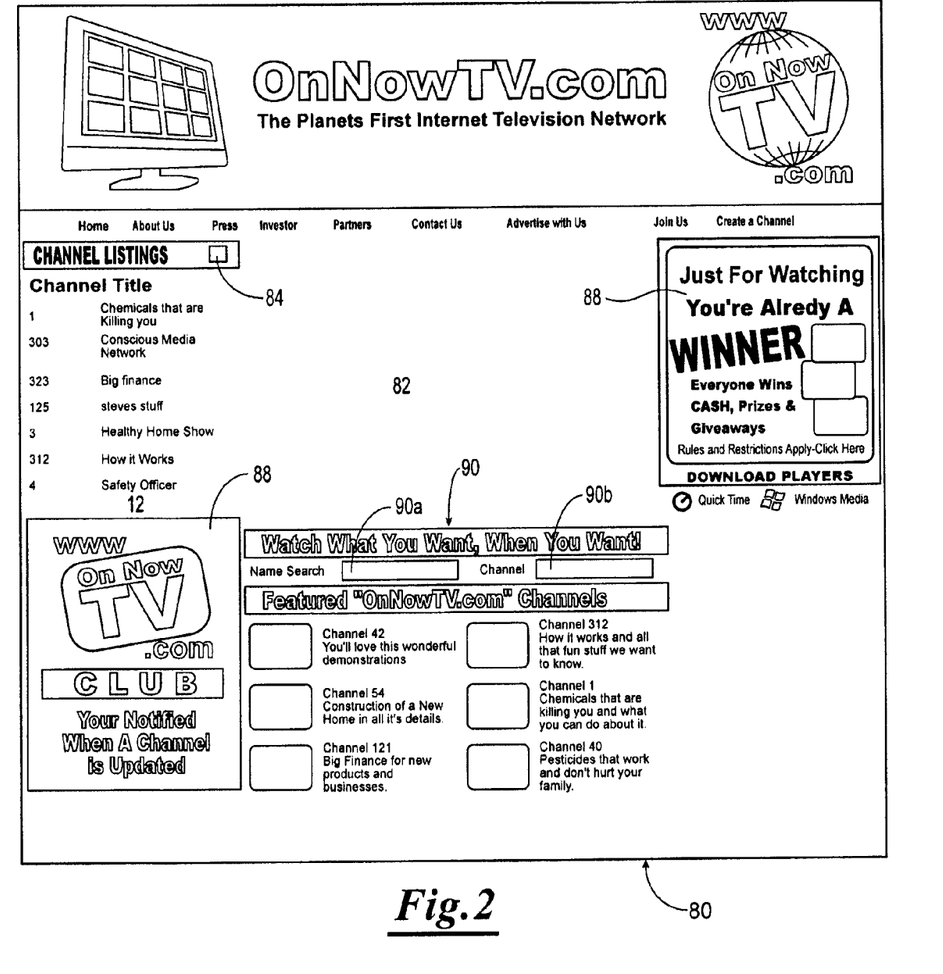
FIG. 2 is a pictorial diagram of one embodiment of a web page utilized in accordance with the present invention.

Referring now to the drawings, and in particular to FIG. 1, shown therein and designated by reference numeral 10 is a Web-based video broadcasting system having multiple channels constructed in accordance with the present invention. In general, the Web-based video broadcasting system (referred to hereinafter as the "system 10") relates generally to Web-based video broadcasting and more particularly, but not by way of limitation, to the system 10 utilizing Web-based video broadcasting in a manner which simulates television broadcasting normally provided to the user via a television set. In general, and as will be discussed in more detail below, the system 10 includes at least one web page or home page 80 (an example is depicted in FIG. 2) which has a channel listing portion providing multiple channels which can be selected on the web page 80 so as to open a selected channel such that the user can perceive video or audiovisual content associated with the channel.

In general, FIG. 1 is an exemplary hardware diagram for the system 10. The system 10 preferably includes a host system 12, communicating with one or more user devices 14 via a network 16. The network 16 can be the Internet or other network. In either case, the host system 12 typically includes one or more servers 18 configured to communicate with the network 16 using one or more gateways 20. When the network 16 is the Internet, the primary user interface of the system 10 is delivered through a series of web pages, but the primary user interface can be replaced by another type of interface, such as a Windows-based application permitting users to access or interact with the host system 12 graphically, textually, audiovisually, or the like. This method can also be used when the user device 14 of the system 10 is located in a stand-alone or non-portable environment such as a kiosk.

The network 16 can be almost any type of network although the Internet and Internet 2 networks are preferred because of the wide support of their underlying technologies. The preferred embodiment of the network 16 exists in an Internet environment, which means a TCP/IP-based network. However, it is conceivable that in the near future, it may be advantageous for the preferred or other embodiments to utilize more advanced networking topologies. In addition, the network 16 does not refer only to computer-based networks but can also represent telephone communications or other communications.

The servers 18 can be networked with a local area network 30. The gateway 20 is one or more entities or devices responsible for providing access between the local area network and the network 16. The gateway 20 can also be used as a security means to protect the local area network 30 from attack from an external network such as the network 16.

The local area network 30 can be based on a TCP/IP network such as the Internet, or can be based on any other suitable underlying network transport technology. The preferred embodiment uses an Ethernet network with TCP/IP because of the availability and acceptance of underlying technologies, but other embodiments may use other types of networks such as Fiber-Channel, SCSI, gigabyte Ethernet, etc.

As discussed above, in one preferred embodiment, the host system 12 includes the servers 18. The configuration of the hardware for the servers 18 will depend greatly upon requirements and needs of the particular embodiment of the system 10. Typical embodiments, including the preferred embodiment, will include multiple servers 18 with load-balancing to increase stability and availability. It is envisioned that the servers 18 will include database servers and applications/web servers. The database servers are preferably separated from the application/web servers to improve availability and also to provide the database servers with improved hardware and storage.

The user devices 14 can be any number and type of devices. The most typical scenario of the user device involves a user 32, using a computer 34 with a monitor 36, a keyboard 38, and a mouse 40. In the preferred embodiment, the user 32 is required to use a type of software called a "browser" as designated by a reference numeral 42. The browser 42 is used to render content that is received from a source, such as the servers 18. In the modern vernacular, a "browser" refers to a specific implementation called a Web browser. Web browsers are used to read and render HTML/XHTML content that is generated when requesting resources from a web server. In the preferred embodiment, the system 10 is designed to be compatible with major Web browser vendors such as Microsoft Internet Explorer, Netscape Navigator and Opera. However, other embodiments may wish to focus on one particular browser depending upon the common user base connecting to the servers 18.

The user devices 14 can also be implemented as a portable device such as a laptop computer 50 (or handheld computer); a cellular telephone 52 with a micro or embedded Web browser; a portable digital assistant 54 (PDA) capable of wireless network access; a pen-based or tablet computer 56. In another embodiment, the user device 14 can be a cable-television box 60 or other similar device, such as a Web TV appliance, for viewing through a monitor 62 or television. Current embodiments of the system 10 can also be modified to use any of these or future developed devices.

The system 10 is designed in this way as to provide flexibility in its deployment. Depending upon the requirements of the particular embodiment, the system 10 could be designed to work in almost any environment such as a desktop application, a Web based application, or simply as a series of Web services designed to communicate with an external application.

Throughout this document, the words individual, user, or consumer are generally used interchangeably, unless otherwise indicated.

Referring now to FIG. 2, shown therein is one exemplary embodiment of a home page 80 constructed in accordance with the present invention and provided by the host system 12 to one or more of the user devices 14, or otherwise in communication with the host system 12 and displayed on the user device 14. In general, the home page 80 is preferably provided with a media player window 82, a channel listing area 84, one or more advertising media areas 88, and one or more search field areas 90. Each channel is preferably provided with a unique channel identifier such that the channel listing area 84 can be further divided or segregated into channel listings and title listings corresponding to the channel listings. For example, as shown in FIG. 2, one of the channels is indicated by the numeral "1", and the corresponding title is "Chemicals that are killing you". It should be noted that the unique channel identifier for each channel can be provided in numeric and/or alphanumeric form, including any one or more numeric, alphanumeric, or symbolic digits, or any combination thereof. For example, unique channel identifiers could be 58, OK47, 32TX, @405, or the like.

In the preferred embodiment, the home page 80 and/or the host system 12 may be programmed to register at least one user parameter for at least one, and more preferably each, user accessing the host system 12 via the home page 80. For example, the host system 12 may read or otherwise access certain information on a user device such as location, name, or-the-like. In other embodiments, the host system 12 may be programmed to request user information, for example via an input portion of the home page 80, a pop-up input page, or the like. In the preferred embodiment, the host system 12 is further programmed to monitor the viewing habits of each viewer so as to customize the home page 80 for the user and return responses to searches that are more likely to correspond to the user's interests. For example, user parameters may include: user location, channel preference, channels viewed, total time viewed, time viewed per day, time viewed per channel, preferred subject, preferred topic, preferred business type, preferred price range, and preferred keyword. In one embodiment, the host system 12 may register and/or track such user parameters by transmitting what is commonly known as a "cookie" containing data indicative of at least one user parameter to a user device associated with the user.

It should also be understood that although only seven channels and corresponding titles are depicted in FIG. 2, this number can vary depending on how many channels the designer or administrator of the home page 80 desires. Each of the channels and/or titles in the channel listings 84 forms a hotlink or hyperlink to a channel with one or more media programs (which may also be referred to as "content files," "video files," or "program files") associated with the channel such that upon choosing or clicking upon one of the channels and/or titles, the media program linked thereto will be brought up and played within the media player window 82 to simulate a television broadcast. In another embodiment, selecting a link or hyperlink corresponding to a channel directs a users web browser to a separate web page or "channel page" 80a having a media player window 82a for displaying the at least one program video file associated with the channel, to be described in more detail below with reference to FIG. 2A.

In the preferred embodiment, when a user accesses the home page 80, the host system 12 checks for user parameters associated with or otherwise registered for the user. The host system 12 can then compare the user parameters with various channel parameters (discussed in more detail below) associated with various channels so as to customize the channel listings 84 of the home page 80. For example, the channel listings 84 can be customized to display hyperlinks for a plurality of channels, with each hyperlink corresponding to a channel having at least one channel parameter related to a user parameter of the user. For example, when a user in Oklahoma accesses the home page 80, the host system 12 can cause the channel listings 84 to display only channels having a parameter related to Oklahoma. Similarly, if a user has a user parameter indicative of an average viewing time of five minutes, the host system 12 can cause the channel listings 84 of the home page 80 to display channels having a channel parameter indicative of an average media file length of five minutes or less. User parameters and channel parameters may be used in any suitable way to organize or display channels to a user or users, or may be used in any suitable way to customize the environment of an individual user in real-time.

Although the channel listings in FIG. 2 depicts only one title or media program associated with each of the channels, it should be understood that one or more media files can be associated with each of the channels. Furthermore, it should be understood that upon clicking or choosing one of the channels, the titles associated or corresponding to that channel can be brought up in the same window or in a separate window such that the one or more media files are displayed sequentially and continuously, and/or can then be chosen individually for display to the user.

Figure 2A:
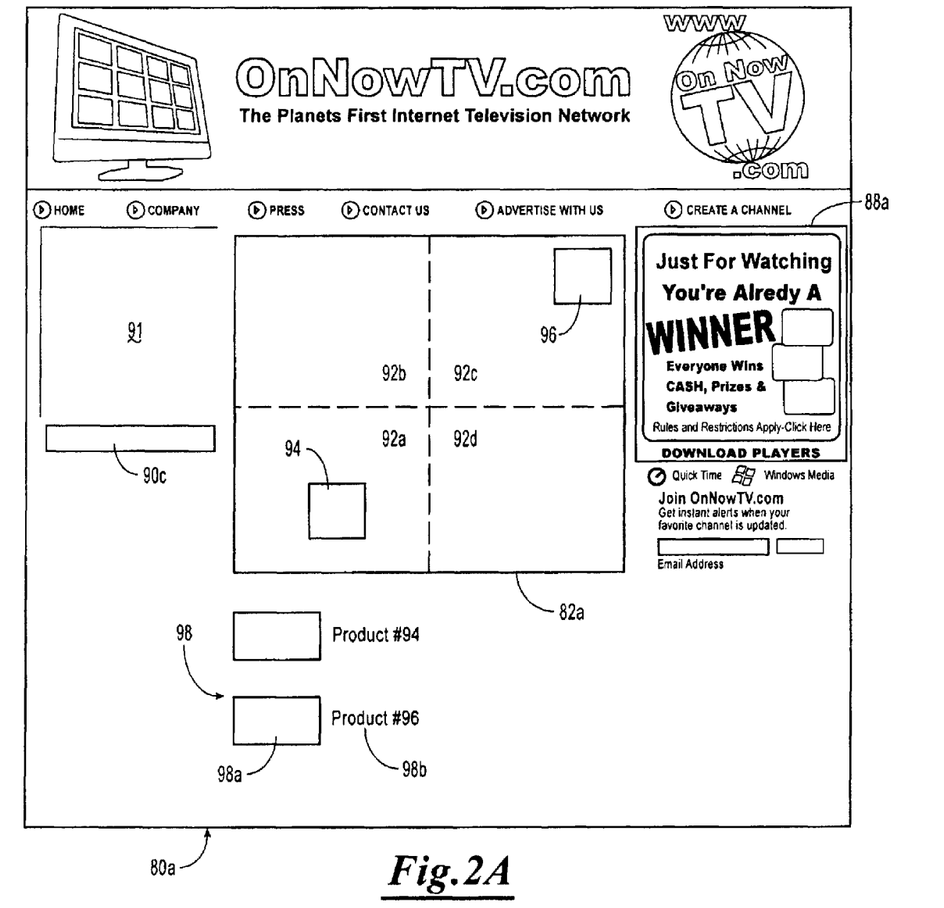
FIG. 2A is a pictorial diagram of one embodiment of a secondary web page utilized in accordance with the present invention.

In the preferred embodiment, when a channel having a plurality of media files associated therewith is selected, the plurality of media files are sequentially and continuously displayed to the user to simulate a television broadcast, until such time as the user selects a different channel, exits the home page 80 or channel page 80a, or closes the web browser. In such an embodiment, the order in which the plurality of media files is displayed may be varied to provide a more interesting display; and/or commercial or other secondary media files may be displayed in conjunction with the media files, for example, before, after, or in between the media files associated with the channel. Such secondary media files may be associated with the channel so as to specifically target the expected viewers of a channel; may be displayed automatically by the host system in some or all channels; may be displayed automatically by the host system in relation to corresponding channel parameters such as topic or region, to be described in more detail below; or may be targeted to a specific user or group of users, accessing one or more channels, such as in relation to one or more user parameters. In other embodiments, individual files may be selected for display by a user, or a user may be permitted to select an order for the media files to be displayed. Similarly, a user may be permitted to stop, pause, fast-forward, and/or rewind various media files associated with a channel.

As discussed above, the home page 80 is provided with one or more search field areas 90. In the example depicted in FIG. 2, the home page 80 is provided with two search field areas designated by the reference numerals 90a and 90b. The search field areas 90a is designated as a name search, and from that the user of the home page 80 can search by way of the name or title of various programs that can be broadcast through the media player window 82. The home page 80 is also provided with a search field area 90b which is labeled in FIG. 2 "channel". The search field area 90b can be used to search for a predetermined or known channel such as one uniquely identified with the numeral "32", so as to avoid scrolling through a list of channels.

In another preferred embodiment, the web page 82 is provided with one or more search field areas (not shown) to permit a user to search for channels relevant to the user's particular interest. To this end, each channel is preferably associated with at least one, but more preferably a plurality of, channel parameters indicative of one or more properties of the channel. Similarly, individual media files may be associated with file parameters as well. For example, channel and/or file parameters may include: country, region, state, area, city, neighborhood, zip code, area code, subject, topic, business type, keyword, price range, keyword, and search priority. For example, channels with programs about home construction services may only be relevant to a particular city or state, such that it is advantageous for the channel to have a channel parameter indicative of the city or state to which it is relevant. Thus, a user can enter, for example, "home construction" and "oklahoma city" into an appropriate search field area 90, and the host system 12 can return one or more channels that are most relevant to the search criteria, that is, one or more channels with channel parameters related to the search terms. Also, the host system 12 can return one or more channels having programs or media files with file parameters that are most relevant to the search criteria, and in some embodiments, when the channel is accessed, cause the most relevant show to be displayed first. Such file parameters may be utilized in any suitable way, such as those herein with respect to user parameters and channel parameters, to organize and/or display various channels, and/or to customize the display and/or organization of various channels and/or media files within each channel for a particular user or group of users.

Referring now to FIG. 2A, one exemplary embodiment of a channel page 80a is depicted in accordance with the present invention. As described below, when a user selects a channel from the one or more web pages 80 (FIG. 2), the channel may be opened in a specific channel page 80a. The channel page 80a is preferably of similar construction as the home page 80, but may be of any suitable organization, layout, design, or the like. The channel page 80a preferably includes a media player window 82a; one or more search field areas 90c permitting users to search the channels by channel identifier, channel parameters, or the like; one or more advertising media areas 88a; and a program listing area 91, depicting names, descriptions, and/or other identifiers for each of the media files associated with the channel.

In one preferred embodiment, one or more channels may further be associated with one or more display parameters determining the manner in which the channel is displayed to users. Such display parameters may include, for example, font, background color, page color, content provider logo, additional images, page layout, or any other parameter directly or indirectly determining the manner in which the channel is displayed to a user, via either home page 80 or channel page 80a. For example, a content provider may wish to define a company logo to be displayed whenever the channel is accessed, or may wish to define a characteristic or trademark color to be displayed as the background color whenever the channel is accessed by a user.

In one preferred embodiment, the channel page 80a further includes a substantially-transparent layer 92 overlying the media window 82a. The layer 92 is preferably segmented into one or more portions or regions 92a-92d. Although, the layer 92 is depicted as having four portions 92a-92d, the layer 92 may be divided into any suitable number of regions. Each portion 92a-92d aligns with a corresponding region of a media file displayed within the media player window 82a. Each region may selectively then be provided with a hyperlink to another web page or web site that a user may select by selecting what is preferably perceived by the user as a portion of the media file displayed within the media player window 82a.

In the preferred embodiment, hyperlinks can be provided for regions 92a-92c corresponding to products or other points of interest depicted within the regions 92a-92d. For example, when a product 94 is depicted at least partially in portion 92a, the portion 92a can be provided with a hyperlink to another web page or web site having information related to product 94. Similarly, when a product 96 is depicted at least partially in portion 92c, portion 92c may be provided with a hyperlink to another web page or web site having information related to product 96. One exemplary method of implementing hyperlinks for portions 92a-92d is to provide transparent .gif images and encode them into a layer above the media player window with each .gif image provided with a hyperlink such that a user perceives to be selecting a portion of the media file displayed, but is actually selecting the transparent .gif image so as to follow the associated hyperlink. Although the .gif images are described as being transparent, they may also be partially transparent, or partially opaque, so long as a user is able to perceive at least a portion of the media file displayed in the media player window.

Hyperlinks for portions of the media file may also be implemented through any other suitable means. For example, hyperlinks may be embedded into the media file itself, for example, in a Flash™ file or the like; may be defined by image mapping or otherwise defining hotzones or other regions or portions which may be selected to follow the hyperlink associated therewith; or may be implemented in any other suitable fashion. As will also be appreciated, hyperlinks corresponding to products displayed in the media file displayed in the media player window 82a may be alternatively, or simultaneously, be displayed in one more product link areas 98 of the page 80a. As depicted in FIG. 2A, such product link areas 92 may include, an image 98a, a product name 98b, and/or a product description (not shown), any or all of which may be provided with a hyperlink leading to another web page or web site having information relating to the product 94 or 96 displayed within the media file. In other embodiments, such hyperlinks may permit a user to immediately purchase the product, for example, when the user has already entered payment and shipping information, or may cause information relating to the product to be displayed in or on a portion of the page 80a, for example, with Flash™ encoding or other dynamic encoding such as HTML, Java Script, DHTML, XHTML, or the like.

In some embodiments, the hyperlinked regions may correspond to static objects, that is, objects, products, or other points of interest that remain in the same portion through the length of the entire media file. In such an embodiment, there is no need for the hyperlink corresponding to the portion to change. In other embodiments, it may be desirable for a hyperlink to be provided for a point of interest that moves through different portions 92a-92d through the length of the media file. In such an embodiments, the host system 12 can be programmed to vary the portion 92a-92d the portion of the media file or media player window 82a the hyperlink is associated with over time, so as to cause the location of the hyperlink to correspond to the location of the product or other point of interest within the media player window 82a over time.

In accordance with the present invention, there are at least three different categories of entities utilizing or associated with providing and/or using the host system 12, and/or the home page 80. In general, the system 10 is operated by one or more administrators (including their agents or affiliates), one or more content providers associated with each channel, and one or more consumers or users. The administrator preferably develops and/or maintains the structure of the host system 12 and/or the home page 80. The administrator sells or leases channels or portions of channels to one or more content providers and collects one or more different types of fees for the administrator's services. For example, the administrator can charge and collect an initial fee or start-up fee for assigning the channels to the content providers, and then collect periodic, such as monthly, maintenance fees to renew a content provider's association with a particular channel, or for a variety of services that the administrator can provide. In some embodiments, the administrator may designate one or more channels to be divided into portions and the portions sold, leased, or otherwise associated with at least one content provider, or with a plurality of content providers, so as to create a time-share type of arrangement wherein a plurality of content providers share a single channel, or wherein one or more content providers share a single channel with the administrator. The administrator may also retain one or more channels and sell individual time slots to content providers, or segment times in a continuous rotation of program segments. In yet further embodiments, the administrator may associate a channel with a content provider without charging a fee, and/or collect revenue by charging others to advertise in association with the channel, such as between content files, or through links on the home page 80 or channel page 80a.

Thus, the content providers are preferably sold or leased one or more channels, and the channel associated with the corresponding content provider(s) such that the content provider(s) and can upload, link, or otherwise associate one or more content files, such as audio and/or video files, with the channel in the host system 12. The content providers structure the content files, and have essentially sole control over the content which is being provided to the host system 12 with respect to each of the channels purchased or leased from the administrator. The administrator can review and/or censor uploaded or linked material within the content files so long as the administrator and content providers agree that the administrator has the right to do so. Both the administrator and the content providers are then able to sell advertising space (or time) to a variety of third parties on the homepage 80 (or related web pages), and as will be described in more detail below with respect to FIG. 4, within the content which is broadcast by or with the aid of the media player window 82.

The consumer utilizes the user devices 14 to visit the home page 80 and/or channel pages 80a (FIG. 2A) and watch the content, such as video and/or audio programs selectively broadcasted through the media player window 82. The administrator and/or the content providers can sell products through a variety of advertising media areas on the home page 80 and/or channel page 80a (FIG. 2A) (or related web pages) of the web site and also provide suitable programming on the web site for receiving payment from the consumers due to the sale of products or services or pay-per-view channels or the like. For example, the administrator may retain a channel and charge an access fee to a user to permit the user to access or view the channel. In one embodiment, the administrator may also collect a portion of such pay-per-view type access fees charged by a content provider, or the administrator may maintain a channel and provide the content so as to collect substantially all of the access fee from the user. In yet another embodiment, the administrator may provide pay-per-view content to be displayed on a content provider's channel such that the administrator collects the fee from a user and pays a portion of the fee to the content provider in the form of a cash payment and/or as a discount or offset for maintenance fees and/or other service fees.

Figure 3:
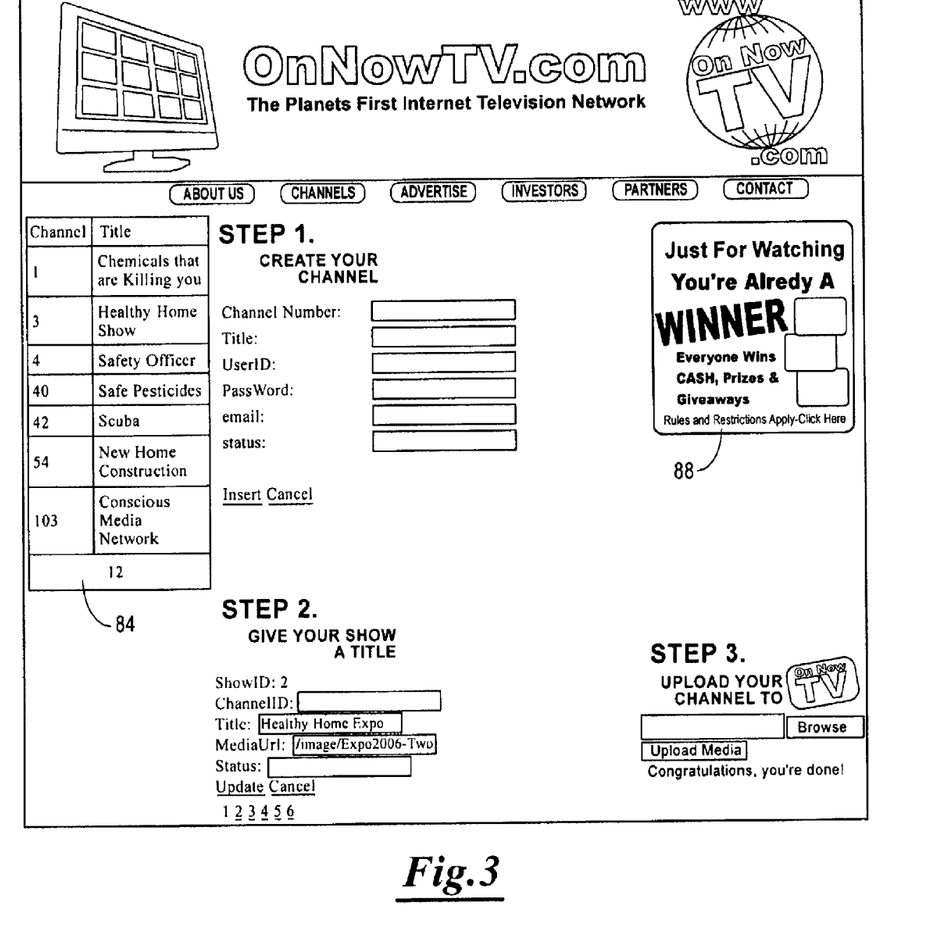
FIG. 3 is a block diagram illustrating a method of distributing and/or authorizing one or more channels in accordance with the present invention.

Referring now to FIG. 3 in combination with FIG. 2, for the administrator or content provider to create a channel, or for the content providers to purchase or lease a channel, a content provider goes to the home page 80 and selects a link which, by way of example, is indicated in FIG. 2 with the heading "create a channel". Upon selecting the link, a series of one or more web pages are brought up to permit the content provider to create a new channel, or possibly modify an existing channel. The administrator desirably provides the status of a requested channel, that is whether or not the channel has already been assigned to a content provider or is still available for purchase or lease. To create a new channel, the administrator, via the host system 12, collects a variety of information from the content provider, such as channel number, title, user ID, password, e-mail address. The content provider fills in the information requested by the administrator and then clicks insert so as to create the new channel. It should be noted that the channel number can either be requested by the content provider or pre-assigned by the administrator.

Once a new channel is created, the content provider preferably then associates various content files, such as video files, with the channel so as to effectively provide the programming for the content provider's channel. An exemplary method of adding content is indicated in FIG. 3 by the area "Step 2". In "Step 2", the content provider provides a channel ID, a title for the content, and then a media URL indicating the location of the content file.

In one preferred embodiment, the content provider is further provided with one or more options and/or text boxes so as to specify or define one or more channel parameters to be associated with the channel that are indicative of one or more properties of the channel. As described above, channel parameters may include: country, region, state, area, city, neighborhood, zip code, area code, subject, topic, business type, keyword, price range, keyword, and search priority. Additional selection fees may further be collected from a content provider for permitting the content provider to define the at least one channel parameter, for defining certain channel parameters, for defining certain channel parameters with values in certain ranges, and/or for defining more than a predetermined number of channel parameters.

For example, a channel may initially be associated with a single geographic channel parameter corresponding to a local area in which the content provider is located, and the content provider could then pay an additional selection fee for each additional geographic channel parameter the content provider wishes to associate with the channel. In another example, a content provider could be assessed a larger fee for a search priority channel parameter that would increase the likelihood that their channel will be displayed to a user searching for channels with one or more other channel parameters. Specifically, if two channels have a topic channel parameter of fishing, one with a search priority of 9 and the other with a search priority of 2, the fishing channel with a search priority of 9 will preferably be more prominently displayed to a user searching for a fishing channel than the channel with a search priority of 2. While certain examples have been described herein, it should be appreciated that additional channel parameters may be defined, and/or additional selection fees charged for permitting a content provider to define any single channel parameter or combination of channel parameters, especially those increasing the number of users directed to a particular channel.

When the content provider has provided the various information within "Step 2" so as to provide content to the channel, the content provider clicks on the link indicated by "update" so as to save the information and the content to the channel, that is, to associate the video file or other media file with the channel. It should be noted that the content provider can locate or provide a variety of different content files for each channel as indicated by the numerals 1, 2, 3, 4, 5, 6 which indicates that, in this example, the content provider can provide six different content files for the one channel. It should be understood that the number of content files may vary. Once the content provider has created the channel, and provided the content for the channel. Then the content provider selects "Step 3" to cause the host system 12 to upload the various media or content files to the servers 18 of the host system 12 for broadcasting the media via the home page 80 and/or a channel page 80a (FIG. 2A) through the media player window 82 and/or 82a.

In some embodiments, the host system 12 may be programmed to permit a content provider to provide a live video feed through the channel. More specifically, the provider may be able to stream a video or other media file through the channel in substantially real-time as the media file is recorded or otherwise generated. In one example, a content provider may be able to stream video of a live auction so as to permit users to view the auction via the home page 80 or channel page 80a and bid on items via the home page 80 or channel page 80a, or via telephone, email, or any other means permitting a user to interact with the content provider or other person involved in the auction. Similarly, it may be advantageous for a content provider to stream live video feeds to display a number of products, such as, in response to one or more user inquiries. For example, a car dealer may get a user inquiry about sedans that are less then 3 years old. The car dealer (or employees, personnel, or automated camera equipment) would then be able to stream, in substantially real-time, video of current inventory matching the inquiry. In another example, the car dealer may wish to hold a live interactive show in which users can communicate their interests to the car dealer, such that the car dealer can provide video of inventory pertaining to individual requests.

In addition, one or more other web pages can be provided to the content provider for permitting the content provider to pay for the purchase and/or leasing of the channel. It should be understood that payment can be provided through a variety of different manners, such as check, credit card, debit card, paypal, or the like. It should also be understood that the various payment terms and/or timings of payment can be specified or provided between the administrator and the content provider such as monthly billing, weekly billing, annual billing, or the like. It should also be understood that the payment frequency and/or amount of the payment can be determined by the traffic which is provided to the channel. For example, the host system 12 preferably records or otherwise registers in real-time the number of users accessing each channel. Thus, the periodic maintenance fees could be adjusted, based upon, or otherwise determined in relation to the number of users accessing the channel for a given period of time, such as, the period of time corresponding to the periodic maintenance fee.

Figure 4:
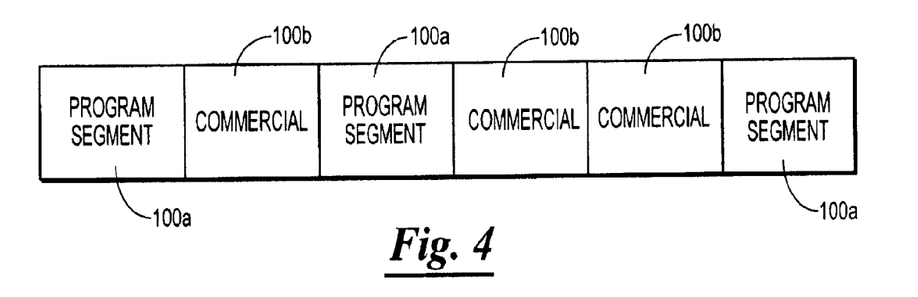
FIG. 4 is a block diagram illustrating a sequence for organizing program segments and commercials utilized in accordance with the present invention.

Referring now to FIG. 4, shown therein is a block diagram illustrating a sequence for organizing program segments 100a and commercials 100b utilized in accordance with the present invention. In general, the program implanted in one or more content files is divided into distinct program segments 100a, and then commercials 100b or other advertising media are inserted in between the program segments 100a. Thus, for example, in the embodiment depicted in FIG. 4, the program includes three program segments 100a and three commercials 100b. Thus, for a thirty minute program, there may be 20-22 minutes of program segments, and 8-10 minutes of commercials, depending upon the design provided by the content providers and/or administrator.

The host system 12 desirably automatically records, in real-time, the amount of users viewing each program offered by the host system. The commercials can be dynamically or automatically inserted between the program segments via a number of factors, such as the subject matter of the program, or the number of users actually watching the program.

Figure 5:
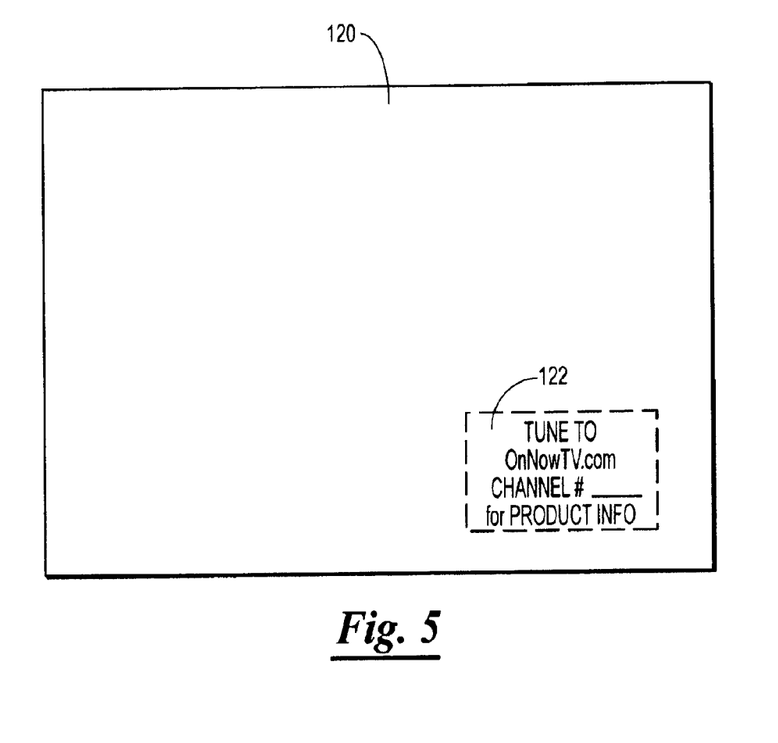
FIG. 5 is a block diagram of a product having a product information logo in accordance with the present invention.

Shown in FIG. 5 is a block diagram of a product 120 having a product information logo 122 provided thereon (or its packaging) in accordance with the present invention. The product information logo 122 preferably includes the channel number and the address of the web-site offered by the host system 12 so that users of the product can obtain information related to the product via the host system 12. The product can be almost any type of product in which content related to the product can be provided by the host system 12, such as an automobile, boat, computer program, computer, telephone system, drug, or the like.

What is claimed is:

1. A web-based video broadcast system, comprising:
   at least one web page in communication with a host system to permit a plurality of users and a plurality of content providers to access the host system, in which the host system is programmed to register a plurality of channels, each registered channel of the plurality of channels is associated with a title listing and a unique channel identifier;
   wherein in response to an electronic request made to the host system by a requesting content provider for an assignment of a channel to the content provider, the host system is programmed to assign and assigns the channel to the requesting content provider whereupon the channel becomes the requesting content provider's registered channel, and to permit user selection of the registered channels using the title listings and the unique channel identifiers;
   wherein upon assignment of a registered channel to the content provider, the host system is further programmed to permit the content provider to selectively upload to the host system a video file and associate the video file with the content provider's registered channel; and,
   wherein the host system is further programmed to store the video file and display the video file in response to a user selecting the content provider's registered channel using a search field area to receive the unique channel identifier via the at least one web page, where the search field area comprises two different search areas having a title search field and a channel search field to search for the content provider's registered channel.

2. The web-based video broadcast system of claim 1, wherein at least one of the plurality of channels is provided with a plurality of portions and wherein the host system is further programmed to associate at least one of the portions of the at least one channel with at least one content provider responsive to a request by the at least one content provider for a portion of the plurality of portions of the channel of the plurality of channels.

3. The web-based video broadcast system of claim 1, wherein the unique channel identifier for each of the plurality of channels comprises at least one digit selected from the group consisting of numeric, alphabetical, and symbolic digits.

4. The web-based video broadcast system of claim 1, wherein the host system is further programmed to permit the content provider to selectively define at least one display parameter for the content provider's registered channel, the display parameter determining the manner in which the registered channel is displayed to users.

5. The web-based video broadcast system of claim 1, wherein at least one of the plurality of channels is only accessible to a user responsive to payment of an access fee.

6. The web-based video broadcast system of claim 1, wherein the host system is further programmed to display at least one secondary video file automatically in conjunction with the video file associated with the content provider's registered channel.

7. The web-based video broadcast system of claim 1, wherein the host system is programmed to associate each of at least a portion of the plurality of channels with the content provider responsive to payment of an initial fee.

8. The web-based video broadcast system of claim 7, wherein payment of the initial fee is accomplished via the at least one web page.

9. The web-based video broadcast system of claim 7, wherein the host system is further programmed to record in real-time the number of users accessing each of the plurality of channels.

10. The web-based video broadcast system of claim 9, wherein the host system is further programmed to periodically renew status of a maintenance fee balance for the content provider assigned the registered channel.

11. The web-based video broadcast system of claim 10, wherein the maintenance fee for the content provider's registered channel is determined in relation to the number of users that have accessed the content provider's registered channel over a predetermined period of time.

12. The web-based video broadcast system of claim 7, wherein the host system is further programmed to associate each of at least a portion of the plurality of channels with at least one channel parameter.

13. The web-based video broadcast system of claim 12, wherein the host system is further programmed to permit each of the plurality of users to selectively search at least a portion of the plurality of channels in relation to the at least one channel parameter.

14. The web-based video broadcast system of claim 12, wherein the host system is further programmed to permit a content provider associated with a channel to selectively define the at least one channel parameter associated with the channel.

15. The web-based video broadcast system of claim 14, wherein the host system is programmed to permit the content provider to selectively define the at least one channel parameter responsive to payment of a selection fee.

16. The web-based video broadcast system of claim 14, wherein the at least one channel parameter is selected from the group consisting of: country, region, state, area, city, neighborhood, zip code, area code, subject, topic, business type, keyword, price range, keyword, and search priority.

17. The web-based video broadcast system of claim 12, wherein the host system is further programmed to register at least one user parameter for each user accessing the host system.

18. The web-based video broadcast system of claim 17, wherein the host system registers the at least one user parameter for at least one user by transmitting a cookie to a user device associated with the user, the cookie containing data indicative of the at least one user parameter for the user.

19. The web-based video broadcast system of claim 17, wherein the at least one user parameter is selected from the group consisting of: user location, channel preference, channels viewed, total time viewed, time viewed per day, time viewed per channel, preferred subject, preferred topic, preferred business type, preferred price range, and preferred keyword.

20. The web-based video broadcast system of claim 17, wherein the host system is further programmed to selectively display to at least one of the plurality of users via the at least one web page a customized list of hyperlinks corresponding to a plurality of registered channels, each of the hyperlinks corresponding to a registered channel having at least one channel parameter related to at least one user parameter for the user.

21. The web-based video broadcast system of claim 1, wherein the host system is further programmed to display via the at least one web page the at least one video file simultaneously with at least one hyperlink corresponding to at least one product depicted in the at least one video file.

22. The web-based video broadcast system of claim 21, wherein the at least one hyperlink is disposed in at least a portion of a substantially transparent layer overlying the at least one video file such that a user is permitted to select the hyperlink by selecting a portion of the at least one video file, the hyperlink corresponding to a product at least partially depicted within the portion of the at least one video file.

23. The web-based video broadcast system of claim 1, wherein the host system is further programmed to permit the content provider assigned the registered channel to associate the video file with the registered channel in substantially real-time such that the video file is displayed to users accessing the registered channel as the video file is generated.

* * * * *